Sept. 14, 1965    W. E. PLASTER    3,206,524
REDUCTION OF ALKYL FLUORIDES AND IMPROVED
ACID HANDLING IN HF ALKYLATION
Filed March 27, 1962
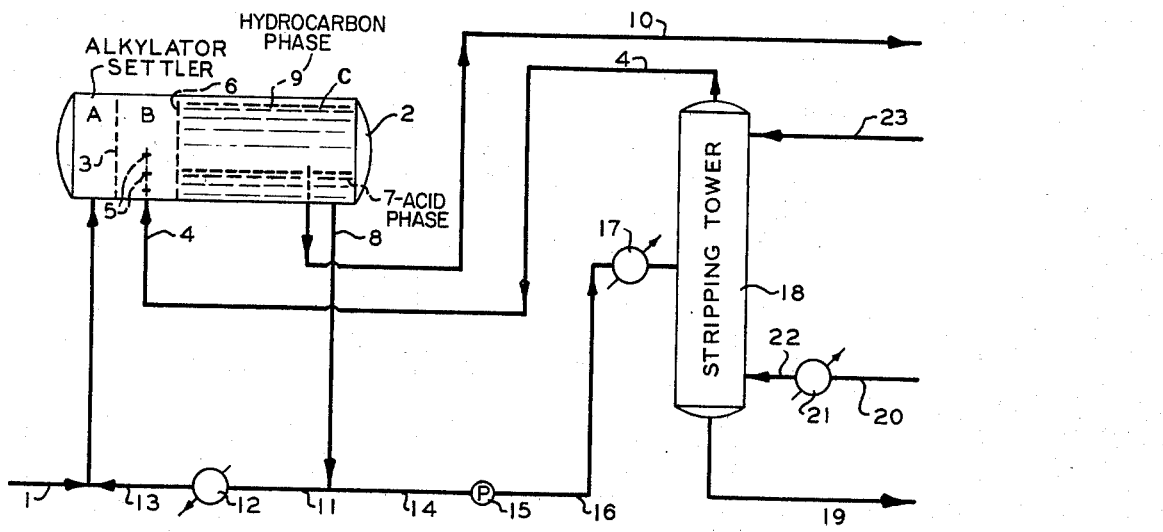
INVENTOR.
W.E. PLASTER
BY
*Young & Quigg*
ATTORNEYS

United States Patent Office 3,206,524
Patented Sept. 14, 1965

---

3,206,524
REDUCTION OF ALKYL FLUORIDES AND IMPROVED ACID HANDLING IN HF ALKYLATION
William E. Plaster, Bartlesville, Okla., assignor to Phillips Petroleum Company, a corporation of Delaware
Filed Mar. 27, 1962, Ser. No. 182,847
1 Claim. (Cl. 260—683.42)

This invention relates to alkylation. In one of its aspects, it relates to the reduction of fluorides in an HF alkylation of af an alkylatable compound with an alkylating compound in which regenerated or re-run HF acid vapors are passed into admixture with alkylation effluent to therein cause alkylation of the alkylatable compound by fluorides contained in said effluent. In another of its aspects, the invention relates to an operation as described wherein re-run HF acid vapors are sparged into an alkylation effluent containing fluorides while said effluent is being settled to separate it into an alkylate phase and an acid phase.

One of the disadvantages or problems required to be overcome in hydrofluoric acid alkylation operations is encountered by reason of the quantities of organic fluorides which are present in the reactor effluent and which must somehow be removed from the alkylate hydrocarbon to render it acceptable for further treatment or use. Thus, quantities of organic fluorides, e.g., alkyl fluorides, in such an alkylation as the alkylation of an isoparaffin and an olefin, for example, alkylation of isobutane with isobutylene or propylene, emerge from the alkylation zone or contactor unreacted and must be further reacted or treated downstream of the reactor system by application of heat or by a bauxite treatment or otherwise involving the use of corrosion resistant or additional and, therefore, expensive construction materials in heat exchangers, fractionating towers, etc. Thus, while treatments for reducing organic fluoride content of alkylation effluent are known and practiced, including the use of liquid HF as it may be admixed with effluent from a settling zone, corrosion problems in heat exchangers and ensuing fractionators are encountered.

It is an object of this invention to provide and alkylation method. It is a further object of this invention to provide a method of reducing or eliminating substantially organic fluorides in an alkylation effluent. It is a further object of this invention to substanitally reduce or to eliminate corrosion problems and/or expensive equipment required to combat corrosion in an alkylation operation. It is a further object of the invention to increase the yield of useful alkylate obtained from an alkylation operation while concomitantly reducing the quantity of alkylating agent or compound resulting in non-recovered by-product material. It is a further object of the invention to so combine an HF acid re-run operation and an HF acid catalyzed as to eliminate expensive condenser while at the same time providing for the reduction of acid soluble oils in an alkylation effluent.

Other aspects, objects and the several advantages of this invention will be apparent from a study of this disclosure, the drawing and appended claim.

According to the present invention, HF acid vapors from HF acid regeneration or re-run are injected or ultimately admixed with an alkylation reactor effluent thus condensing said vapors and simultaneously causing reduction of organic fluorides in said effluent by reaction of the same with alkylatable compound in said effluent.

Further according to the present invention, there is provided in an upstream portion of an acid settler in a substantially conventional HF acid alkylation operation a secondary reaction zone into which are sparged vapors obtained from the conventional acid re-run column. The vapors which preferably are overhead vapors from the column are passed directly, without intermediate condensing, into the secondary reaction zone .

Referring now to the drawing, there is now described a specific example of an operation according to the present invention, as well as an apparatus according to the present invention. The conditions of the operation are given in the following tabular material. An alkylation mixture is passed by 1 into alkylation section A of an alkylator-settler vessel 2. Alkylation takes place in section A and the effluent from A passes through first perforated baffle 3 into section B into which there is sparged by means of manifold 4 and nozzles 5 re-run acid vapors obtained as later described. Under the conditions prevailing in section B, the pressure in alkylator-settler 2 being approximately 132 p.s.i.a. the vapors are condensed causing reaction of organic fluorides with isobutane, thus substantially reducing or eliminating fluorides and absorbing into the ultimate acid phase acid soluble oils so that the combined mixture having passed through baffle 6 and having been separated into acid phase 7 drawn off by 8 and hydrocarbon phase 9 taken off by 10 yields this hydrocarbon phase with a considerably reduced alkyl fluoride and/or acid soluble oils content. The hydrocarbon phase taken off by 10 can be sent directly to fractionation for recovery and recycle of isoparaffin by conventional means. The further treatment of the alkylate-containing stream does not form a part of this invention. A portion of the acid phase in 8 is passed by 11, acid cooler 12 and 13 to 1 and thus recycled to the alkylator-settle vessel. Another portion passes by 14, re-run acid pump 15, 16 and acid feed heater 17 into acid re-run tower 18. In stripping tower 18, the acid is vaporized and stripped with the aid of vaporized isobutane, and refluxed with liquid isobutane, so that overhead there is recovered a mixture of re-run acid and hydrocarbon vapor which is passed directly by 4 to nozzles 5 for use as earlier described. Bottoms from 18 are removed at 19 and consist essentially of acid soluble oils. Stripping isobutane is passed by 20, heater 21 and 22 into tower 18. Reflux liquid isobutane is passed by 23 into the top portion of tower 18.

Table I

| BPSD | 1 | 4 | 10 | 16 | 19 | 20 | 23 |
|---|---|---|---|---|---|---|---|
| HF | 20 | 348 | 100 | 348 | | | |
| C₃= | 694 | | | | | | |
| C₃ | 1,879 | 23 | 1,981 | 3 | | 10 | 10 |
| iC₄ | 13,932 | 228 | 12,388 | 22 | | 103 | 103 |
| C₄= | 708 | | | | | | |
| nC₄ | 3,259 | 83 | 3,336 | 41 | | 21 | 21 |
| C₅+ | 122 | 109 | 2,698 | 107 | | 1 | 1 |
| ASO | | 15 | | 20 | 5 | | |
| H₂O | | 3 | | 3 | | | |
| | 20,614 | 809 | 20,503 | 544 | 5 | 135 | 135 |

Table II

[Temperatures, °F.]

| | |
|---|---|
| Alkylator-settler 2: | |
| Section A | 103 |
| Section B | 105 |
| Section C | 105 |
| Cooler 12: Recycle acid outlet 13 | 93 |
| Cooling water: | |
| Inlet | 86 |
| Outlet | 91 |
| Re-run tower 18: | |
| Top | 270 |
| Bottom | 300 |
| Reflux iC$_4$ | 100 |
| Stripping iC$_4$ | 370 |

Table III

[Pressures, p.s.i.a.]

| | |
|---|---|
| Alkylator-settler 2 | 130 |
| Re-run tower 18 | 150 |

The composition of the acid recycle stream 8 in the foregoing example is, by volume percent, HF 87, C$_3$, C$_4$'s 7, acid soluble oil 5, water 1. The recycle acid circulates at a rate of 43,800 bbl./day.

The alkylator-settler in the foregoing example is 40 feet long and has a diameter of 10 feet and is substantially cylindrically shaped. The section A portion is made of acid resistant material such as Monel or Hastelloy.

The fluorides in stream 10 without practice of the present invention would be approximately 500–1000 parts per million. With practice of the present invention, that is, injection of stream 4 into section B, the fluoride content of stream 10 is reduced to within the range 100–200 parts per million.

The acid re-run column used in the foregoing example is the conventional column and was 3 feet by 16 feet in size.

Generally, the temperature of the acid re-run vapors will be in the range 240–300° F. and the amount of vapors returned directly to the alkylation effluent, for example, section B, will be sufficient to maintain the temperature in Section B at a value in the range 95–110° F.

In the type of operation over which the present invention provides an important improvement with advantages as set out herein, the hydrocarbon phase from the acid settler is heated and passed to a fractionation zone. Acid in the fractionation zone overhead is condensed and is returned to the operation as a condensate, while acid from the acid regenerator or re-run zone is also condensed and returned as a condensate to the operation.

The specific operation provided by the present invention is fully distinguished from all other known operations in which acid-containing fluid is passed from one place to another in an alkylation operation. Furthermore, as far as I am aware, the specific modus operandi which can be and is effected in the specific form of apparatus of my invention is also fully distinguished from the prior art injections of acid containing material or apparatus for so doing. Still, the operation of the present invention is to be distinguished from the injection of liquid HF to the settler effluent, which, while effective for defluorination, causes problems of and due to corrosion in the heat exchanger and the following fractionator.

It will be noted that the acid stream of the present invention is taken from the acid re-run zone. In the acid re-run zone the used acid, fed thereto, is denuded of acid soluble oils and any organic fluorides. This conditioning provides an advantage. The re-run acid overhead can physically absorb or pick up acid soluble oil in the alkylation zone hydrocarbon effluent, preventing substantially the carry-over of undersirable components to the alkylate stream passing beyond the point of injection of the re-run overhead in the settler. Thus, a purification effect is accomplished in the settler which not only removes organic fluorides by converting the same into additional alkylate, but also purifies the alkylate by removing therefrom acid soluble oils and, of course, some unreacted fluorides to the extent, in a given case, the reaction of certain fluorides has not been completed.

Since the re-run overhead in the now-preferred form of the invention is not even passed through a heat exchanger, since it need not be condensed, the heat therein is to a large extent saved by being in the settler effluent and passing therefrom to the first tower in the fractionator train, as the heat contained in the hydrocarbon phase, and to the re-run unit as it is contained in the acid fed to this unit. This reduces the heat duty of the heater preceding the first tower in the fractionating train, as well as the heat duty of the heater used to pre-heat the acid re-run feed. Obviously, there is a saving of an expensive condenser which now no longer is needed to condense the acid re-run overhead. It also happens that the utilities costs are decreased substantially for the overall unit because less cooling water and steam are required. The radiant heat loss from the settler and the heat in the settler effluent account for the stated reduction in utilities costs.

Further, by the operation of the present invention, there are eliminated or at least considerably reduced the use of heat, contact masses such as bauxite or other treatment now in use to reduce effectively the fluorides that pass through the reactor and settler system when the fluorides are not reduced in the settler as by the present invention.

Thus, it is seen that the invention, in effect, provides a secondary reaction in the settler between organic fluorides and isoparaffin, e.g., isobutane or other alkylatable compound. Although the method of the present invention has been described in connection with an embodiment in which the acid re-run overhead is injected or sparged into a space between at least two baffles at the upstream of the settler, it is within the scope of the invention to otherwise contact the re-run acid overhead with at least a portion of the alkylation contactor or reactor effluent either in presence of the settling acid associated therewith or in the substantial absence thereof. Thus, a basic concept of the present method is to contact the acid re-run overhead vapors as such with the organic fluorides found in the alkylation effluent hydrocarbons to cause alkylation of an alkylatable compound therein to form additional alkylate and to reduce the organic fluorides, the acid being substantially freed of acid soluble oils and at a temperature such that a substantial reaction between the fluorides and the alkylatable compound or isoparaffin will occur.

It is especially emphasized that the contacting of the acid re-run overhead vapors is effected in the settler or a zone which is a zone or vessel already adapted to receive and to contain highly corrosive material. The use of the present invention does not require coping with any corrosion downstream of the settler other than encountered in the absence of the use of the invention.

Reasonable variation and modification are possible within the scope of the foregoing disclosure, the drawing and the appended claims to this invention the essence of which is that there have been provided a method for alkylating an alkylatable compound with an alkylating agent in the presence of hydrofluoric acid catalyst and reducing fluoride content of the effluent obtained by conducting into said effluent re-run HF acid vapors without condensing the same and an apparatus comprising means for directly injecting HF re-run vessel vapors into alkylation effluent in a section of a settler which, in one embodiment, comprises injection means located adjacent at least one perforated partition located across an intermediate section of said settler.

I claim:

A method for alkylating an alkylatable compound with an alkylating agent in the presence of HF acid which comprises passing said compounds and said acid into an alkylation zone maintained under alkylating conditions, removing an effluent from said zone, settling said effluent to obtain a hydrocarbon phase and an acid phase, removing the hydrocarbon phase from the operation, recovering the acid phase, re-running at least a portion of the acid phase in a heated acid re-run stripping zone, obtaining re-run acid at a temperature in the range of approximately 240–300° F., directly passing at least a portion of said re-run acids vapors as obtained through said alkylation effluent, and commingling said re-run acid vapors with said alkylation effluent to cause alkylation of alkylatable compound and organic fluorides in said effluent.

References Cited by the Examiner

UNITED STATES PATENTS

| | | | |
|---|---|---|---|
| 2,389,971 | 11/45 | Frey | 260—683.49 |
| 2,434,000 | 1/48 | Matuszak | 260—683.49 |
| 2,615,928 | 10/52 | Jolly | 260—683.68 X |
| 2,920,124 | 1/60 | Stiles at al. | 260—683.59 |

ALPHONSO D. SULLIVAN, *Primary Examiner.*